US012099159B2

(12) United States Patent
Harris et al.

(10) Patent No.: US 12,099,159 B2
(45) Date of Patent: Sep. 24, 2024

(54) MODELING AND SIMULATING FAULTS IN SUBTERRANEAN FORMATIONS

(71) Applicant: Schlumberger Technology Corporation, Sugar Land, TX (US)

(72) Inventors: Simon Harris, Abingdon (GB); Samita Santoshini, Kuala Lumpur (MY); Stephen Grenfell, Abingdon (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 349 days.

(21) Appl. No.: 17/594,264

(22) PCT Filed: Apr. 15, 2020

(86) PCT No.: PCT/US2020/028200
§ 371 (c)(1),
(2) Date: Oct. 8, 2021

(87) PCT Pub. No.: WO2020/214635
PCT Pub. Date: Oct. 22, 2020

(65) Prior Publication Data
US 2022/0163692 A1 May 26, 2022

Related U.S. Application Data

(60) Provisional application No. 62/833,843, filed on Apr. 15, 2019, provisional application No. 62/833,856, filed on Apr. 15, 2019.

(51) Int. Cl.
*G01V 20/00* (2024.01)
*G01V 1/30* (2006.01)

(52) U.S. Cl.
CPC .............. *G01V 20/00* (2024.01); *G01V 1/301* (2013.01); *G01V 2210/642* (2013.01)

(58) Field of Classification Search
CPC .................. G01V 20/00; G01V 1/301; G01V 2210/642
See application file for complete search history.

(56) References Cited

U.S. PATENT DOCUMENTS

| 8,315,845 | B2 * | 11/2012 | Lepage ................... G01V 11/00 703/10 |
| 9,229,130 | B1 * | 1/2016 | Mallet ..................... G06T 19/20 |
| 9,524,590 | B1 | 12/2016 | Mallet |
| 9,600,608 | B2 | 3/2017 | Poudret et al. |

(Continued)

FOREIGN PATENT DOCUMENTS

| WO | 2018065027 A1 | 4/2018 |
| WO | 2019/191746 A1 | 10/2019 |

OTHER PUBLICATIONS

Extended Search Report issued in European Patent Application No. 20791552.1 dated Jan. 5, 2023, 11 pages.

(Continued)

*Primary Examiner* — Manish S Shah
*Assistant Examiner* — Sharad Timilsina
(74) *Attorney, Agent, or Firm* — Jeffrey D. Frantz

(57) ABSTRACT

Methods for modeling and simulating fractured subterranean volumes include a method including obtaining geological data representing a subterranean volume, generating a structural model thereof in depositional space and in structural space. The method includes selecting a first cell and a second cell in the model, the first and second cells being juxtaposed in geological space and defining a fault face where the first and second cells are intersected by a fault, identifying a first point on the fault face, and calculating slip curves. Respective slip curves originate at the point and extend across the fault in geological space to a respective second point of a plurality of second points. The second points are co-located with the first point in the depositional space. The method includes calculating fault (Continued)

rock properties at the first point based on the slip curves and adjusting the model to include the fault rock properties.

20 Claims, 11 Drawing Sheets

(56) References Cited

U.S. PATENT DOCUMENTS

| | | |
|---|---|---|
| 2015/0260016 A1 | 9/2015 | Fung et al. |
| 2016/0103246 A1 | 4/2016 | Freeman et al. |
| 2016/0124117 A1 | 5/2016 | Huang et al. |
| 2018/0137223 A1* | 5/2018 | Fung ............... E21B 43/16 |
| 2020/0025971 A1* | 1/2020 | Vergnes ............ G01V 20/00 |

OTHER PUBLICATIONS

Benabbou et al., "An Unstructured Depositional Grid for Property Modeling," Petroleum Geostatistics, Biarritz, France, Sep. 7-11, 2015, 6 pages.

Freeman et al., "Cross-fault sealing, baffling and fluid flow in 3D geological models: tools for analysis, visualization and interpretation," From: Jolley et al. (eds), Reservoir Compartmentalization. Geological Society, London, Special Publications, 347, 257-282, The Geological Society of London. Downloaded from http://sp.lyellcollection.org/ at Schlumberger on Dec. 31, 2021.

Harris et al. "Complex Geological Modeling and Quality Assurance Using Unstructured Grids," Abu Dhabi International Petroleum Exhibition & Conference, Abu Dhabi, Nov. 12-15, 2018, SPE-193202-MS, 20 pages.

Levannier et al., "Geological Modeling in Structurally Complex Settings Using a Depositional Space and Cut-Cell Unstructured Grids," SPE Middle East Oil & Gas Show and Conference, Bahrain, Mar. 6-9, 2017. SPE-183960-MS, 12 pages.

International Search Report and Written Opinion of International Patent Application No. PCT/US2020/028200.

International Preliminary Report on Patentability of International Patent Application No. PCT/US2020/028200.

Communication Pursuant to Article 94(3) issued in European Patent Application No. 20791552.1 dated Apr. 17, 2024, 5 pages.

* cited by examiner

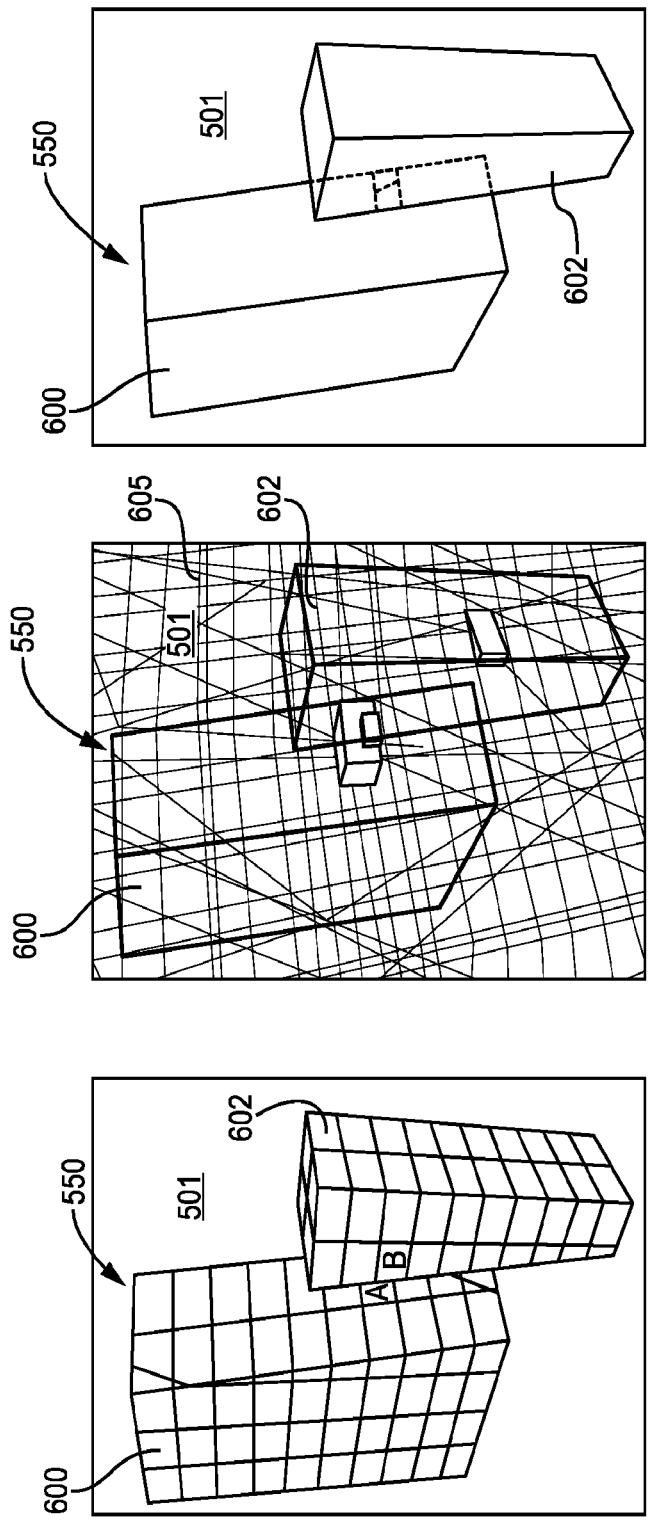

MODELING AND SIMULATING FAULTS IN SUBTERRANEAN FORMATIONS

CROSS-REFERENCE TO RELATED APPLICATIONS

This application is a National Stage Entry of International Patent Application No. PCT/US2020/028200, filed on Apr. 15, 2020, which claims priority to U.S. Provisional Patent Application No. 62/833,856, which was filed on Apr. 15, 2019, and U.S. Provisional Patent Application No. 62/833,843, which was filed on Apr. 15, 2019. Each of these priority applications is incorporated herein by reference in its entirety.

BACKGROUND

In the oil and gas field, subterranean formations are modeled to provide information to operators. Such information may prove useful in a variety of contexts, such as identifying a likely reservoir location for hydrocarbons, providing input for well treatment operations, informing well planning, providing economic feedback for projects, and/or providing information related to production of fluids from a well. These are just a few examples, however, among many that will be apparent to one of skill in the art.

There are many different techniques for modeling a subterranean volume and simulating flow through faulted media. For example, models may be formed by grid elements (cells) representing discrete areas of the model. A variety of different types of grids may be applied to the models, producing cells that represent discrete areas of the formation.

Further, the subterranean formation being modeled may have faults. The representation of the faults, e.g., in reservoir-scale models, may be implicit, such that the faults are defined at the interface between grid cells, but not separately represented in the model. This representation is convenient for reservoir simulation, and the influence of the fault on the flow in the reservoir is controlled by a fault transmissibility multiplier (TM). This dimensionless multiplier simply defines the ratio of the transmissibility through the fault and the adjacent grid cells in comparison to the transmissibility through those grid cells with no fault present. However, such a simplification can lead to inaccuracy in the model.

SUMMARY

Embodiments of the disclosure may provide a method including obtaining geological data representing a subterranean volume, generating a structural model of the subterranean volume in depositional space and in structural space, the model including a grid of cells, selecting a first cell and a second cell of the grid of cells, the first and second cells being juxtaposed in geological space and defining a fault face where the first and second cells are intersected by a fault, identifying a first point that is on the fault face of the first and second cells, and calculating a plurality of slip curves. Respective slip curves originate at the point and extend across the fault in geological space to a respective second point of a plurality of second points, the second points being co-located with the first point in the depositional space. The method further includes calculating one or more fault rock properties at the first point based on rock properties encountered along the slip curves and adjusting the model to include the one or more fault rock properties.

Embodiments of the disclosure may further provide a method including obtaining geological data representing a subterranean volume, generating a static model of the subterranean volume, the static model comprising a grid of cells, faults in the subterranean domain being represented as boundaries between adjacent cells that lie on the faults, calculating one or more fault-face properties for individual boundaries between adjacent cells that lie on one of the faults, calculating transmissibility in the model using the one or more fault-face properties for the individual boundaries, and adjusting the model by adjusting one or more of the fault-face properties of one of the individual boundaries.

Embodiments of the disclosure may further provide a non-transitory, computer-readable medium storing instructions that, when executed, cause one or more processors of a computing system to perform operations. The operations include obtaining geological data representing a subterranean volume, generating a structural model of the subterranean volume in depositional space and in structural space, the model including a grid of cells, selecting a first cell and a second cell of the grid of cells, the first and second cells being juxtaposed in geological space and defining a fault face where the first and second cells are intersected by a fault, identifying a first point that is on the fault face of the first and second cells, and calculating a plurality of slip curves. Respective slip curves originate at the point and extend across the fault in geological space to a respective second point of a plurality of second points, the second points being co-located with the first point in the depositional space. The method also includes calculating one or more fault rock properties at the first point based on rock properties encountered along the slip curves and adjusting the model to include the one or more fault rock properties.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 6A, 6B, 6C, 6D, 6E illustrate conceptual views of a portion of the model shown in FIG. 5D, according to an embodiment.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Subterranean Modeling Environment

Figure 1:
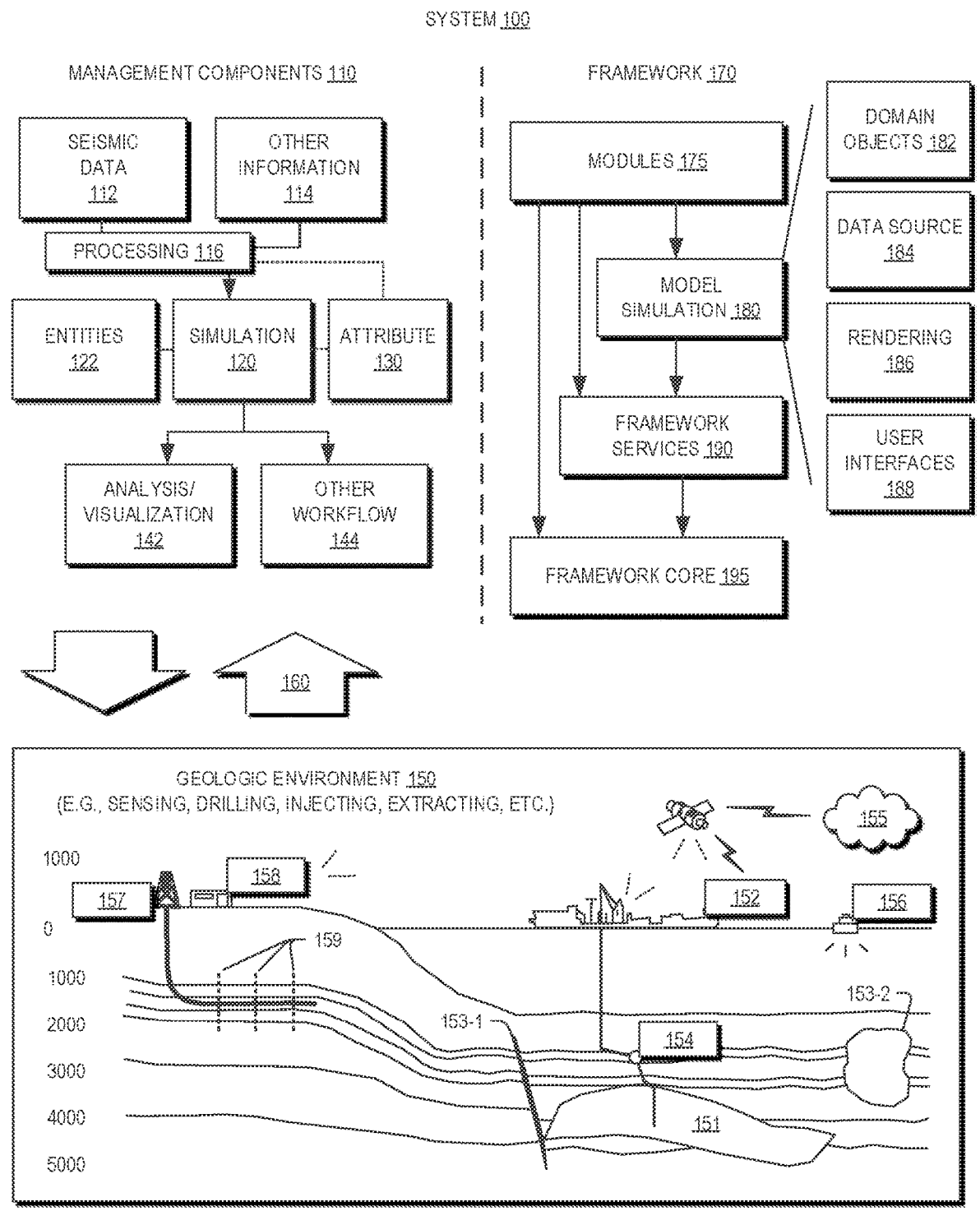
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Washington), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT' reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Texas). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Texas) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
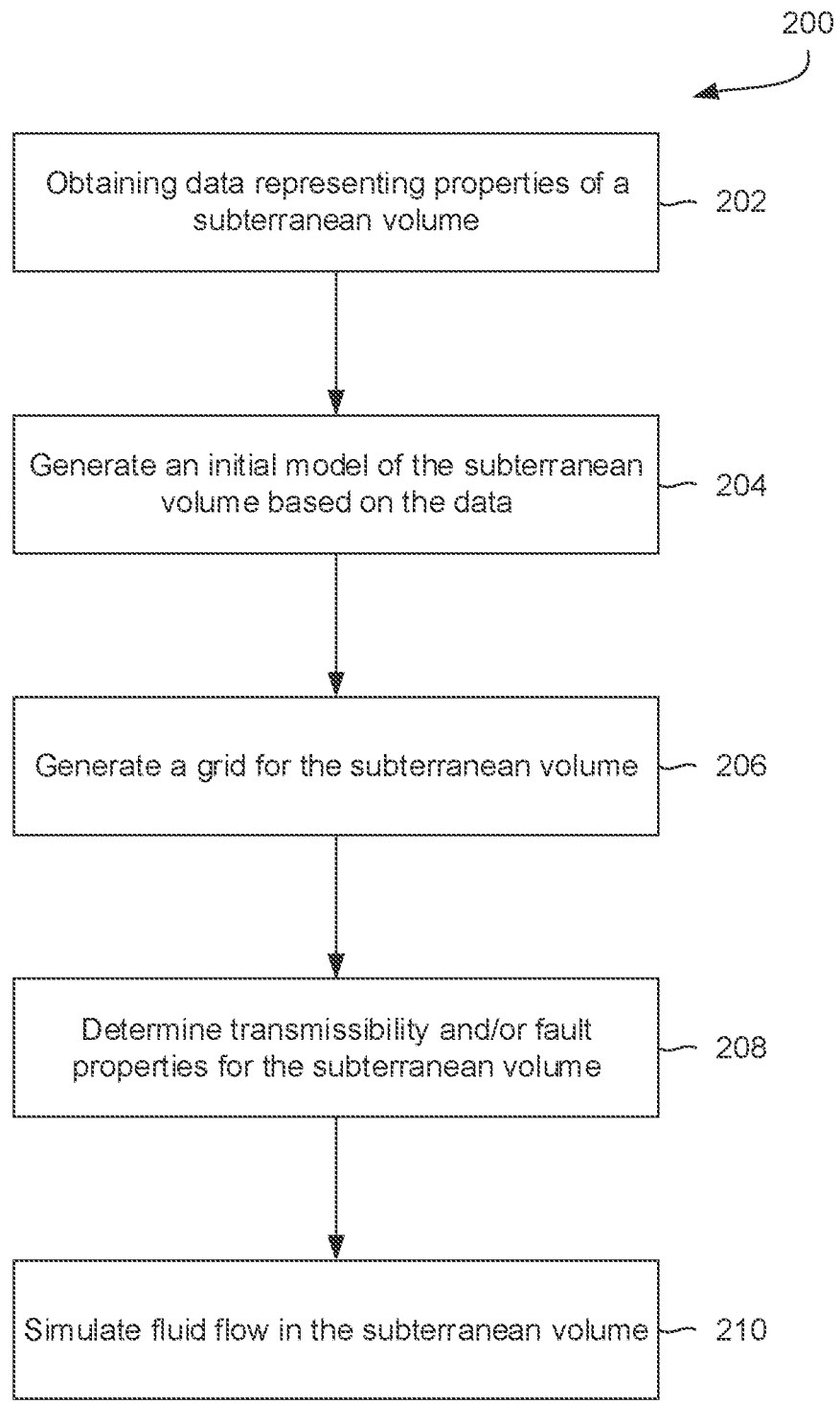
FIG. 2 illustrates a flowchart of a method for modeling and simulating a subterranean volume, according to an embodiment.

FIG. 2 illustrates a flowchart of a method 200 for modeling and simulating a subterranean volume, according to an embodiment. The method 200 may include obtaining data (e.g., core samples, seismic data, well logs, and/or any other data) representing properties of a subterranean volume, as at 202. From these properties, an initial model of the subterranean volume may be generated, as at 204.

The initial model may be gridded, i.e., partitioned into cells, which may be structured or unstructured, as at 206. Transmissibility and/or other fault properties may be determined for the subterranean volume, e.g., on a cell-by-cell basis, as at 208. Once the model is populated with the cell and fault properties, fluid flow may be simulated, as at 210.

Depogrid Generation and Fault Seal Property Calculation

Figure 3A:
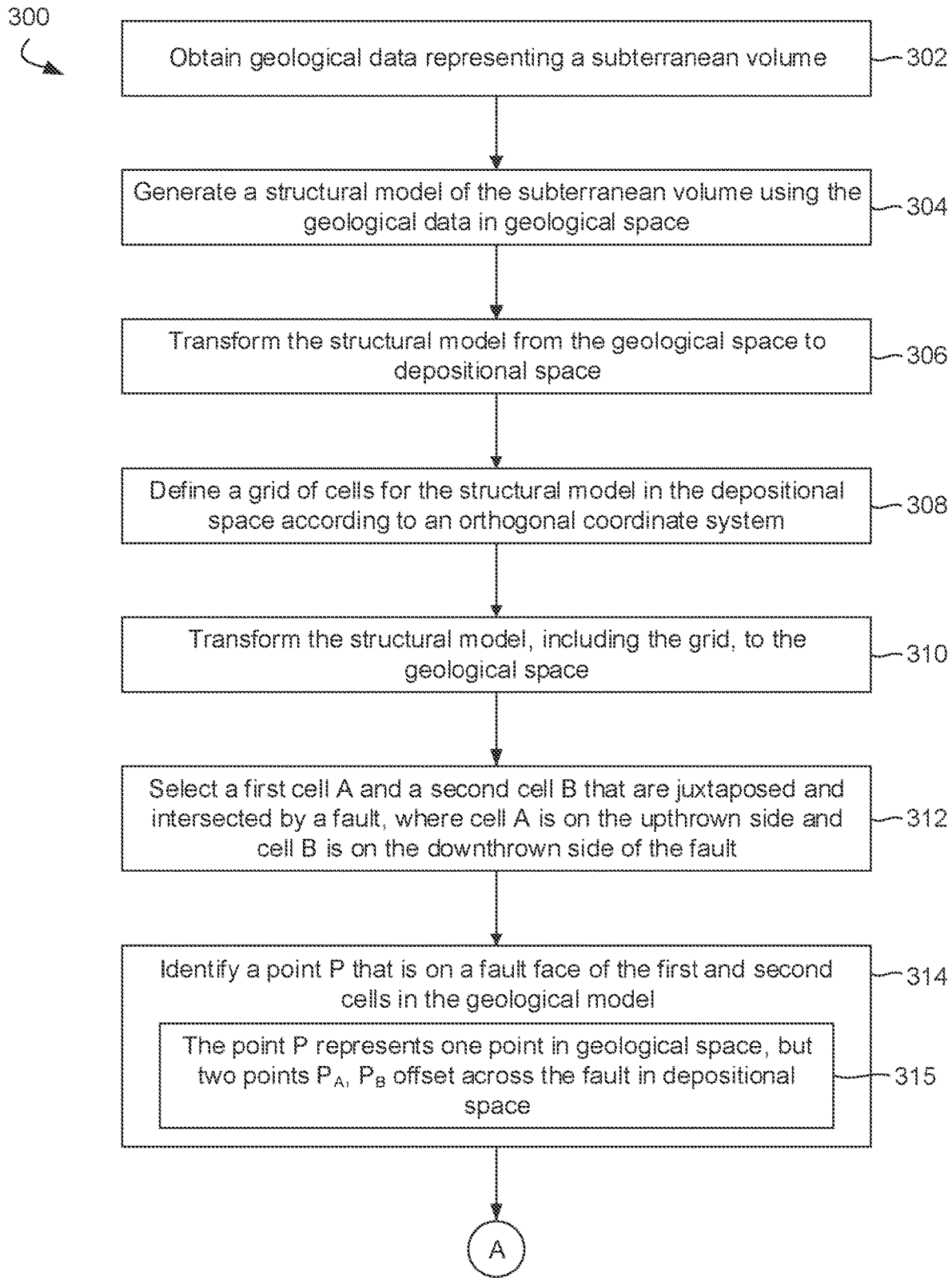
FIGS. 3A and 3B illustrate a flowchart of a method for determining fault properties in the model of the subterranean volume, according to an embodiment.
Figure 3B:
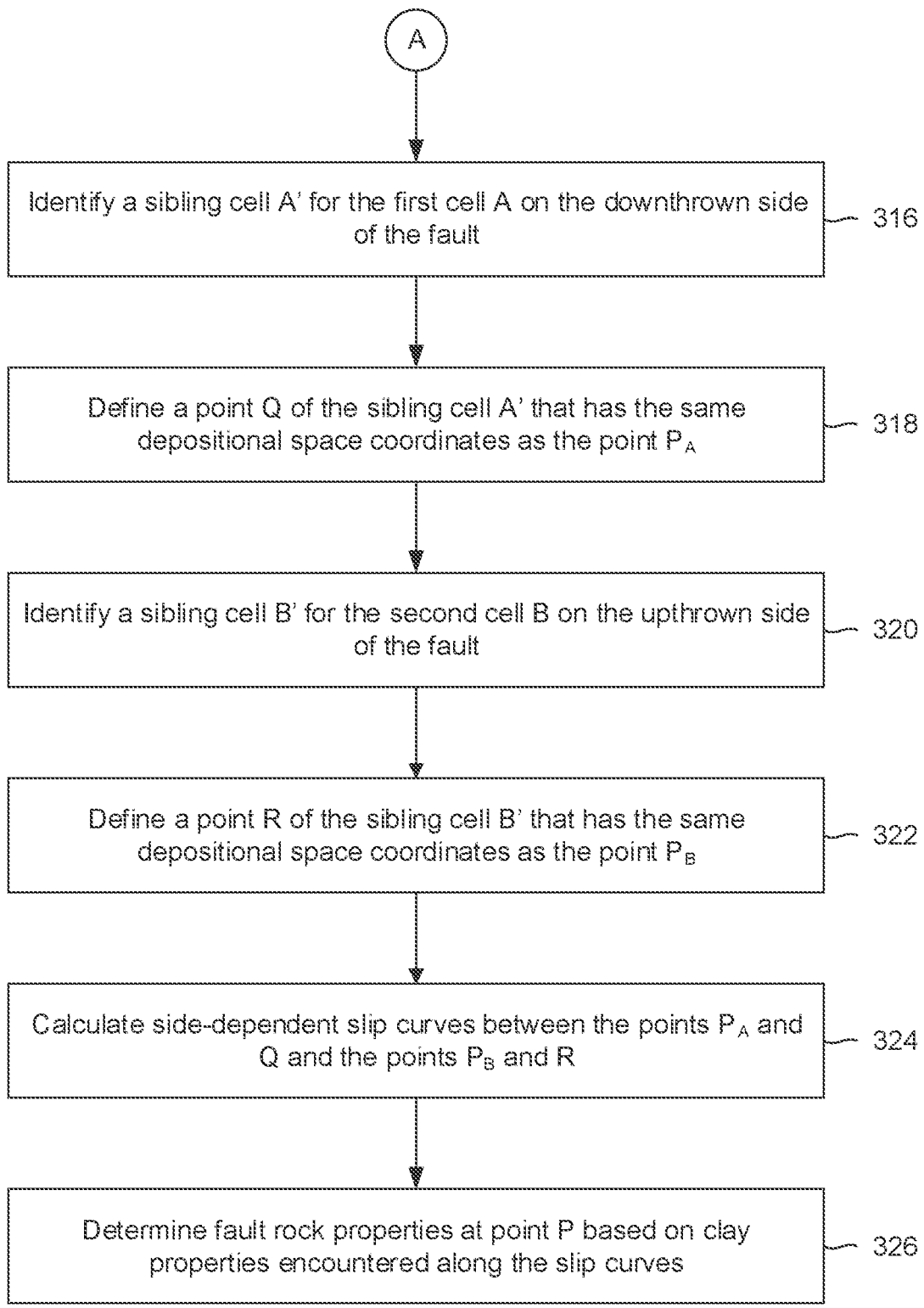

FIG. 3 illustrates a flowchart of a method 300 for determining fault properties in the model of the subterranean volume, according to an embodiment. The method 300 may provide at least a part of blocks 204-206 in FIG. 2, in addition to one or more other aspects thereof; however, in other embodiments, the method 300 may be executed separately from the method 200. Further, it will be appreciated that the individual worksteps described herein for the method 300 may be conducted in a different order than shown, combined with other worksteps, conducted in parallel with other worksteps, or separated into two or more worksteps, without departing from the scope of the present disclosure.

The method 300 may include obtaining geological data representing a subterranean volume, as at 302. The geological data may be gathered from any source, such as publicly available or proprietary databases, well logs, seismic logs, core sample analyses, etc. The geological data may represent a variety of formation properties, such as permeability, porosity, pore pressure, structure, rock type/composition, and/or any other relevant formation property at a variety of locations in the subterranean volume, fault property data and/or relationships for predicting fault properties.

Figure 4:
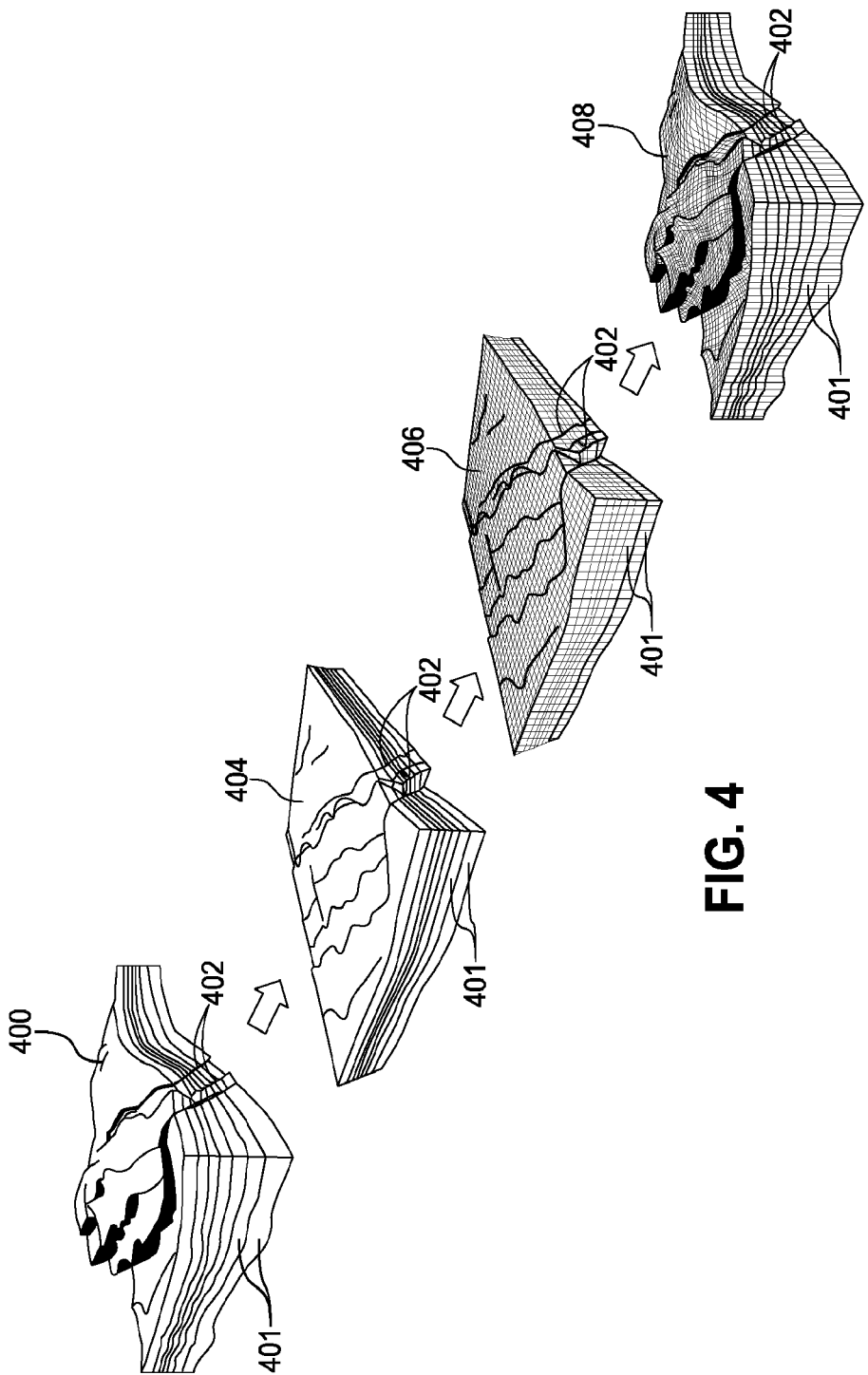
FIG. 4 illustrates a conceptual view of a structural model in geological space being transformed into depositional space, gridded, and then transformed back to geological space, according to an embodiment.

The method 300 may be executed by generating at least two versions of a geological model, which both represent the subterranean volume and its properties. In order to do so, the method 300 may begin by generating a structural model, in geological space, of the subterranean volume using the geological data, as at 304. Geological space may be defined in general terms as the physical shape of the structure of the subterranean formation in space, i.e., based on the geological data, how it would appear at a given time in three-dimensional space. An example of such a structural model is shown in FIG. 4, represented by reference number 400. As illustrated, the model 400 may represent the geology of the volume, e.g., showing several layers or geological "zones" 401. The geology may also include faults 402, the presence of which may render the zones 401 discontinuous and offset across the faults 402. As such, in the geological space, the layers 401 may be relatively complex, having varying thickness, may occupy a variety of depths, may be discontinuous, etc.

Accordingly, the method 300 may proceed to transforming the model 400 into the depositional space, as at 306, as shown in a model 404 that represents the same volume as the model 400. In the depositional space model 404, the layers 401 are represented in a vertical direction by a time parameter w, rendering the layers 401 flat (when not eroded or including discontinuities), despite the presence of faults 402. In turn, the faults 402 are represented as surfaces that extend in the model 404.

As indicated at 308 of FIG. 3, the model 404 in the depositional space may then have a grid defined therein, so as to delineate cells, generating the gridded, depositional-space model 406. The grid cells may be uniformly defined, for example, in the horizontal directions (u, v) and in the vertical direction w, e.g., generally resulting in a grid of uniform shaped cells in the vertical w direction in depositional space, per zone 401.

As indicated at 310, the gridded model 406 in the depositional space may then be transformed, along with the grid, back to the structural space, thereby generating the model 408 in FIG. 4. As with the initial model 400, the model 408 reflects the structure of the subterranean volume consistent with physical parameters of horizontal position and depth. The model 408 may also be referred to as a "depogrid" 408. This transformation to depositional space defines a one-to-one mapping (except at the faults 402) between points in the structural model 408 in geological space and points in the corresponding model 406 in depositional space. A point located exactly on a fault surface of the model 406 in depositional space corresponds to two (or more at fault-fault intersections) points in geological space (e.g., in model 408), as the point may be separately considered to lie on each of the two sides of that fault. Each point on the fault surface in geological space (e.g., in the depogrid 408) is therefore represented by several co-located points that have unique depospace locations. This correspondence of points in the depositional and geological spaces will be used later to define the fault seal properties of the depogrid.

The faults 402 and zones 401 of the depogrid 408 thus accurately match those of the original structural model 400, while the additional grid layers between the seismic horizons (i.e., the boundaries of the original layers 401) honor the stratigraphic nature of the depositional mapping. When viewed in the geological space, the w coordinate lines retain their orthogonal relationship with the local seismic horizons that was enforced in depositional space.

Referring again to FIG. 3, with the structural models in the depositional space and the geological space, with grid, prepared, the method 300 may focus on the use of inverse depositional mapping to infer fault seal properties of the subterranean volume (represented by the depogrid 408). Accordingly, the method 300 may, for example, include selecting first and second cells that are intersected by a fault, which are juxtaposed (e.g., directly adjacent) in the depogrid (e.g., the gridded model in geological space), as at 312. For example, the first and second cells may meet at a fault over multiple planar fault face polygons, with the first cell A being on the upthrown side and the second cell B being on the downthrown side. The method 300 may then include selecting, as at 314, a point on one of these fault faces, e.g., point P ($x_p$, $y_p$, $z_p$) in geological space, which may be at the center of one of the fault faces. As indicated at 315, the point P residing on the fault face may represent a single point in geological space, but two points $P_A$ and $P_B$ on opposite sides of the fault in depositional space, as will be described in greater detail below.

Figure 5A:
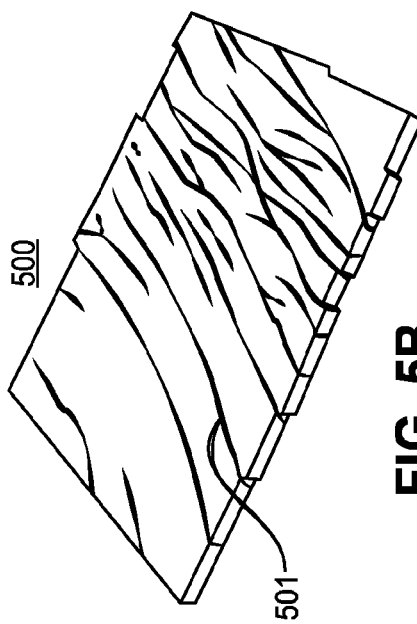
FIGS. 5A, 5B, 5C, and 5D illustrate conceptual views of a portion of the model at a fault, according to an embodiment.
Figure 5B:
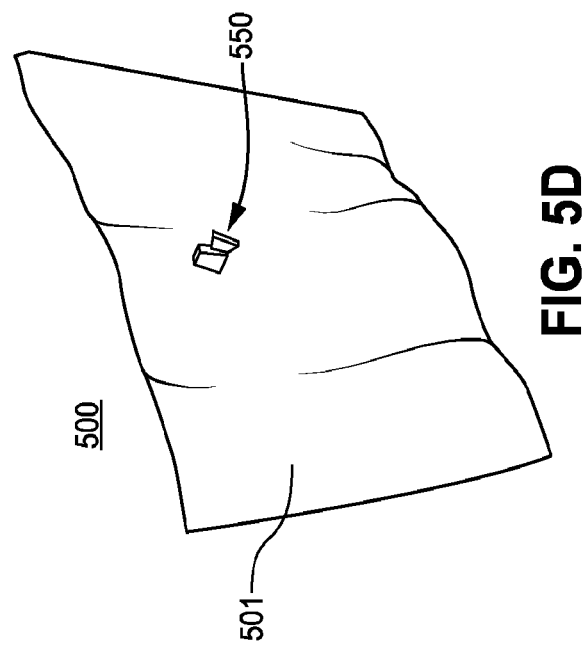
Figure 5C:
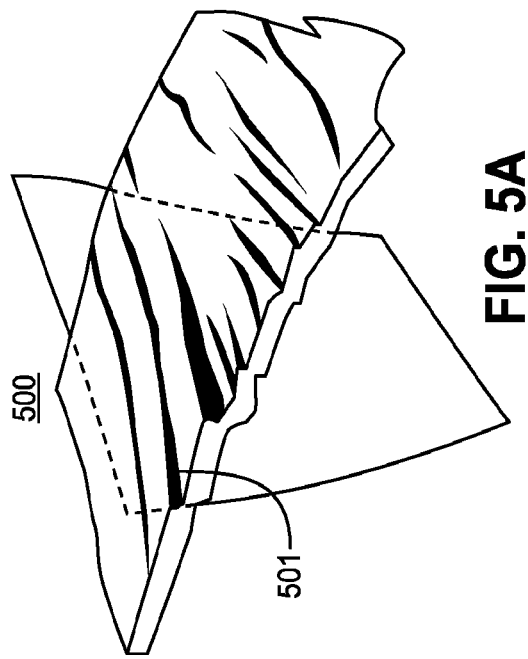
Figure 5D:
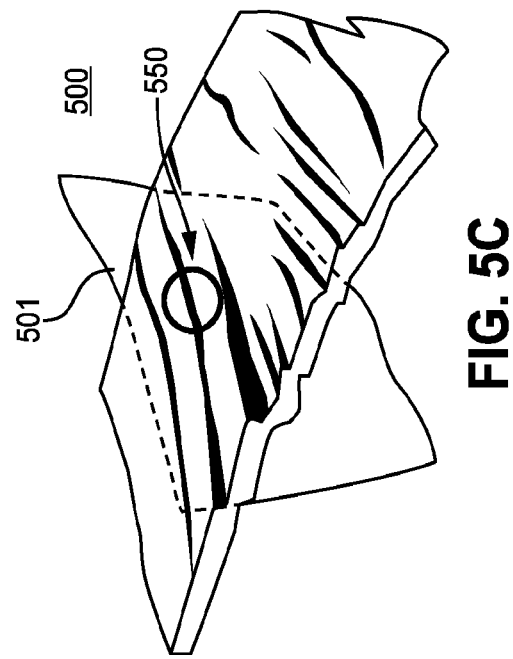

Proceeding now to FIG. 5A, there is shown a portion (e.g., "zone") of a model 500 of the subterranean formation in geological space, focusing on a single fault 501. In this example, the fault offset is sufficient to produce some areas of self-juxtaposition of the zone across the fault 501. FIG. 5B shows the same zone, but in the depositional space. In the depositional space view, the fault offsets have been removed and the faults (e.g., the fault 501) may be seen as zero-offset traces on the zone. The fault 501 surface represents a discontinuity in geological space; any point on the fault surface in geological space (FIG. 5A) may be considered to lie in either the upthrown or downthrown side of the fault 501. Such a point has the same (x, y, z) location in geological space but different depositional space (u, v, w) coordinates according to the assumed side of fault. FIG. 5C illustrates the depogrid version of this zone. As shown in FIG. 5D, a specific region 550 of the depogrid and fault 501 may be used to illustrate an example of analysis of the fault offsets and fault seal properties.

Proceeding now to FIG. 6A, there is shown an enlarged view of the specific region 550 from FIG. 5D, specifically illustrating an upthrown side 600 and a downthrown side 602 of the fault 501. Referring again additionally to block 312 of FIG. 3, the first cell is labeled as cell A and the second cell is labeled as cell B. As can be seen, cell A is generally on the upthrown side 600, in geological space, and the second cell (cell B) is generally on the downthrown side 602, in geological space. As can be seen in FIG. 6B, the fault 501 has many fault faces 605, the geometry of which relates to the combined overlaps of grid cells and the faces of the tetrahedral mesh of the structural model. The fault face geometry thereby honors the original structural model, as explained above.

The point P (selected at 314) may thus first be considered as a part of cell A, specifically, part of the upthrown side 600 of the fault in geological space, and therefore part of the faces of cell A that lie on the fault surface. The depositional space coordinates of the point P for cell A are denoted by $P_A(u_A, v_A, w_A)$. In depositional space, cell A is one part of a single hexahedral cell that is cut by the faults of the model. Sub-parts of a given hexahedral cell are referred to as the "sibling" cells. Accordingly, the method 300 may include identifying one or more sibling cells for the first cell (cell A), as at 316. In this example, cell A, which is still referred to as the "first cell" although it is actually representing a portion of the first cell as defined in depositional space, has a single sibling cell A' on the downthrown side 602 of the fault, as is visible in FIG. 6D.

Next, the method 300 may include, at 318, identifying a point in the sibling cell A' that has the same depositional space coordinates as the point $P_A$. In this example, a point $Q(x_Q, y_Q, z_Q)$ in geological space may be defined as the point on the faces of the sibling cell A' that has the same depositional space coordinates as $P_A$, namely $Q(u_A, v_A, w_A)$. In depositional space, $P_A$ for cell A is co-located with Q at $(u_A, v_A, w_A)$, but in the geological space, the points $P_A$ and Q are offset across the fault 501.

Figure 6E:
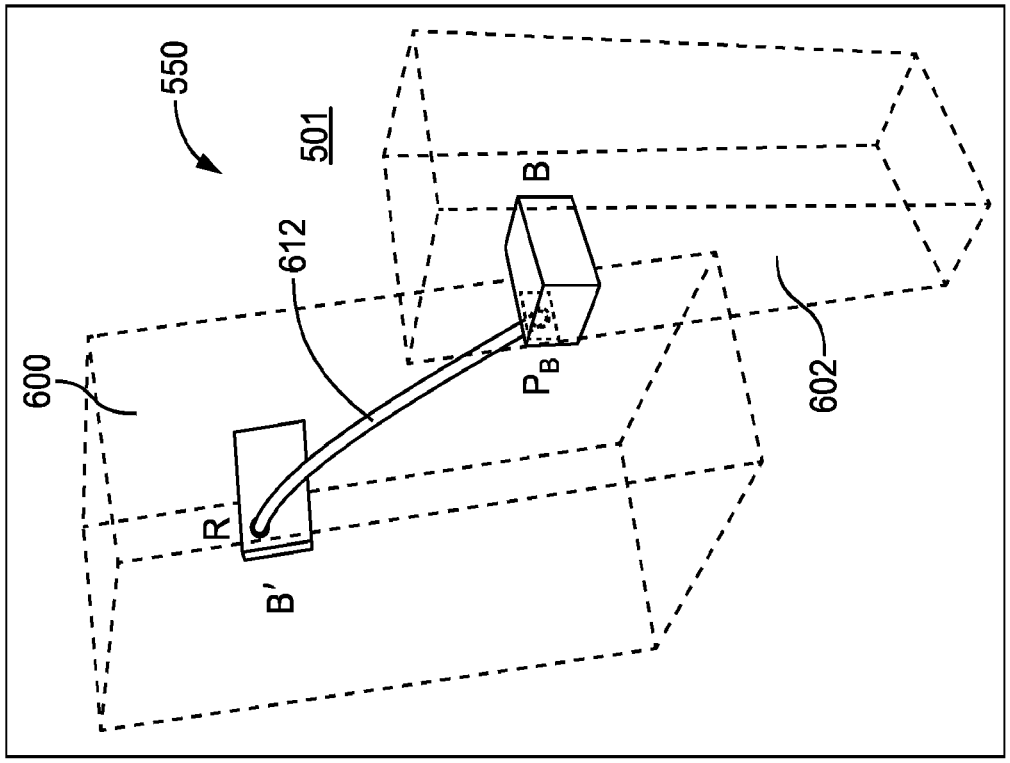
Figure 6D:
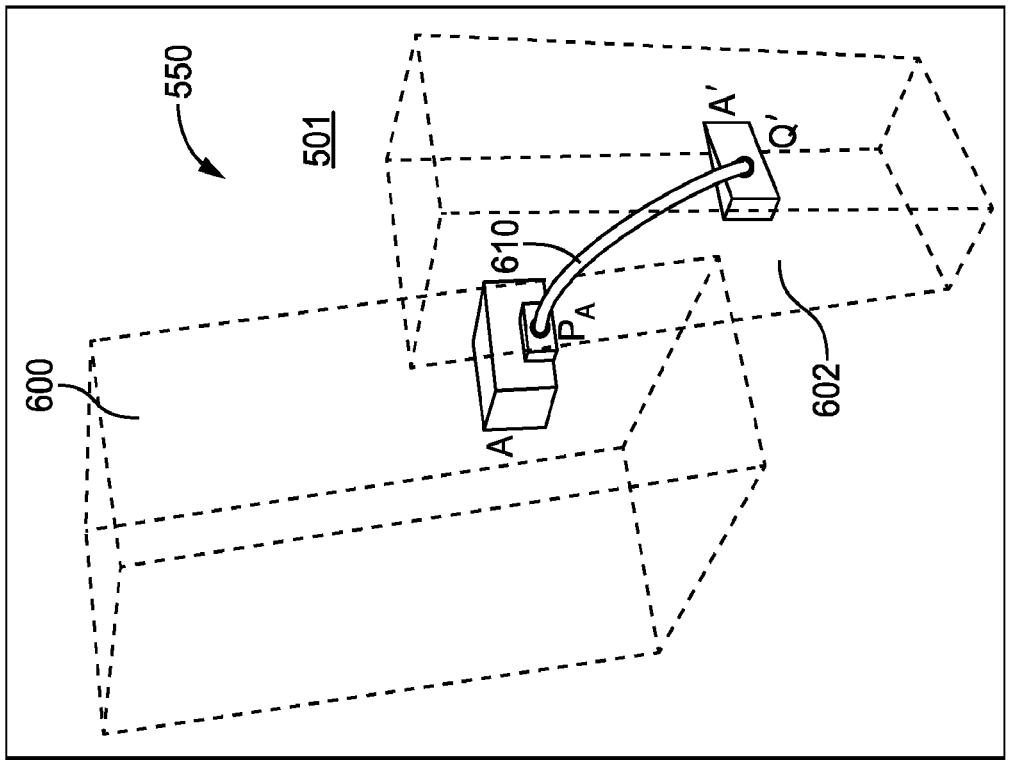

Next, the point P may be considered part of the downthrown side 602 of the fault in geological space, and therefore part of the faces of the second cell (cell B) that lie on the fault surface. The depositional space coordinates of the point P for cell B are denoted as $P_B(u_B, v_B, w_B)$. In depositional space, cell B is one part of a single hexahedral cell that is cut by the fault 501. As with the first cell, the method 300 may proceed to identifying one or more sibling cells for the second cell (cell B), as at 320. In this case, cell B (which is representing a portion of the second cell denoted in the depositional space) has a sibling cell B' on the upthrown side 600 of the fault 501, as shown in FIG. 6E.

The method 300 may then, at 322, include defining a point $R(x_R, y_R, z_R)$ that is on a face of the sibling cell B' that has the same depositional space coordinates as $P_B$, namely $R(u_B, v_B, w_B)$. That is, in depositional space, $P_B$ for cell B is co-located with R at coordinates $(u_B, v_B, w_B)$, but the two points $P_B$ and R are offset in the geological space by the presence of the fault 501.

The inverse transformation of the depogrid cells from depositional space to geological space allows consideration of one point P in the geological space to be two points $P_A$, $P_B$, one on each side of the fault 501, i.e., $P=P_A(x_P, y_P, z_P)=P_B(x_P, y_P, z_P)$. Each of these points $P_A$, $P_B$ has a depositional space neighbor: $P_A(u_A, v_A, w_A)=Q$ and $P_B(u_B, v_B, w_B)=R$; that is, in the depositional space, $P_A$ is co-located with Q and $P_B$ is co-located with R.

The method 300 may then proceed to determining slip curves between the point P (i.e., the points $P_A$ and $P_B$) and the sibling points Q and R offset across the fault 501 therefrom in geological space, as at 324. The inverse transformation (from depositional space to geological space) associates $P_A$ with Q and $P_B$ with R. Points $P_A$ and $P_B$ are co-located with points Q and R, respectively, in depositional space and separated along-side-dependent slip curves 610, 612 in FIGS. 6D and 6E in geological space. The curves 610, 612 may be defined directly from the depositional transformation or inferred from the geological space locations of $P(x_P, y_P, z_P)$, $Q(x_Q, y_Q, z_Q)$ and $R(x_R, y_R, z_R)$.

The fault offset at P is defined by considering the separate offsets between $P_A$ and Q (downthrown side offset) and $P_B$ and R (upthrown side offset) along the indicated slip direction curves 610, 612. The total fault offsets may be the average of the side-dependent results. Thus:

fault throw at $P=\frac{1}{2}(|z_P-z_Q|+|z_P-z_R|)$;

fault displacement at $P=\frac{1}{2}(|$curve from $P_A$ to $Q|+|$curve from $P_B$ to $R|)$;

fault heave at $P=\frac{1}{2}(\sqrt{(x_P-x_Q)^2+(y_P-y_Q)^2}+\sqrt{(x_P-x_R)^2+(y_P-y_R)^2})$.

The fault properties may then be determined based on side-dependent slip curves, as at 326. For example, the calculation of the fault displacement may be consistent with the definition of the side-dependent SGR (shale gouge ratio) properties at P. The fault rock properties at P for each side of the fault are defined by the grid clay volume (VClay) properties encountered along the side-dependent slip direction curves 610, 612. Further, the SGR for the upthrown side 600 of the fault may be the average clay content of the upthrown side 600 grid VClay property along the curve 612 from $P_B$ to R (FIG. 6E). The SGR for the downthrown side 602 may be the average clay content of the downthrown side 602 grid VClay property along the curve 610 from $P_A$ to Q (FIG. 3D). The SGR at P for the fault 501 is then the weighted average of the side-dependent SGR values, weighted by the side-dependent displacement values.

Other fault clay content estimates such as the ESGR (effective SGR) and clay smearing properties may follow directly from the same extraction of the host VClay properties along the side-dependent slip direction curves 610, 612. These fault clay content predictions may be based on properties from the modeled fault surface but define properties specific to the areas on the fault where both upthrown and downthrown cells occur.

The subsequent fault seal properties such as fault threshold pressure, sealing capacity, permeability and thickness for exploration and development fault seal workflows follow using standard calculations based on the above definitions of the fault clay content and displacement estimates. In particular, the fault thickness, threshold pressure and permeability are input properties for the fluid flow simulation of the depogrid. The property calculation may then be extended to as many points P and/or cells of the grid as appropriate, e.g., along each of the faults.

The depogrid generated by the method 300 may thus represent an advancement by providing more accurate information in the model, specifically of fault properties. Further, the method 300 may include visualizing the newly generated depogrid, e.g., to illustrate the formation on a computer screen. This depogrid may then be used, for example, to assist in simulations of fluid flow in the subterranean volume, e.g., to assist in the identification of likely hydrocarbon reservoirs.

Representation and Manipulation of Fault Properties in Implicit Fault Models

Embodiments of the disclosure may also provide an integrated modeling-to-simulation method for a more accurate fault transmissibility calculation, which facilitates accurate history matching. In general, the method may include providing a fault transmissibility calculation algorithm inside a simulator based on geological fault properties defined on a reservoir model. The geological information and properties are specified in the modeling environment; these properties together with the fault permeability and fault thickness information are passed to the simulator. The simulator calculates the cell-to-cell transmissibility for the individual cells including the cells adjacent to the faults. This transmissibility calculation can use either two-point or multi-point flux approximations within the numerical description of cell-to-cell transmissibility. This approach may avoid the use of a fault transmissibility multiplier (TM) property.

The geological realizations (modified grid permeability, modified fault permeability, modified fault thickness) may be provided to the simulator, which uses this geological data to calculate modified grid cell transmissibilities and to tune the simulation model. Embodiments of the present disclosure may host the geological definition of the fault properties within the tight simulator history-matching workflow. This may facilitate consideration of uncertainty in the fault displacement distributions, the host grid clay content from which the fault clay content is derived, the fault clay content algorithms used to predict the fault permeability, and the geological history of the faults that controls the fault clay to permeability transform.

The static modeling environment and the reservoir simulator may both access a fault property calculation service. The service will receive grid geometrical and property data and provide updated fault property calculations, based on a geological scenario containing key algorithmic choices and empirical data.

Figure 7:
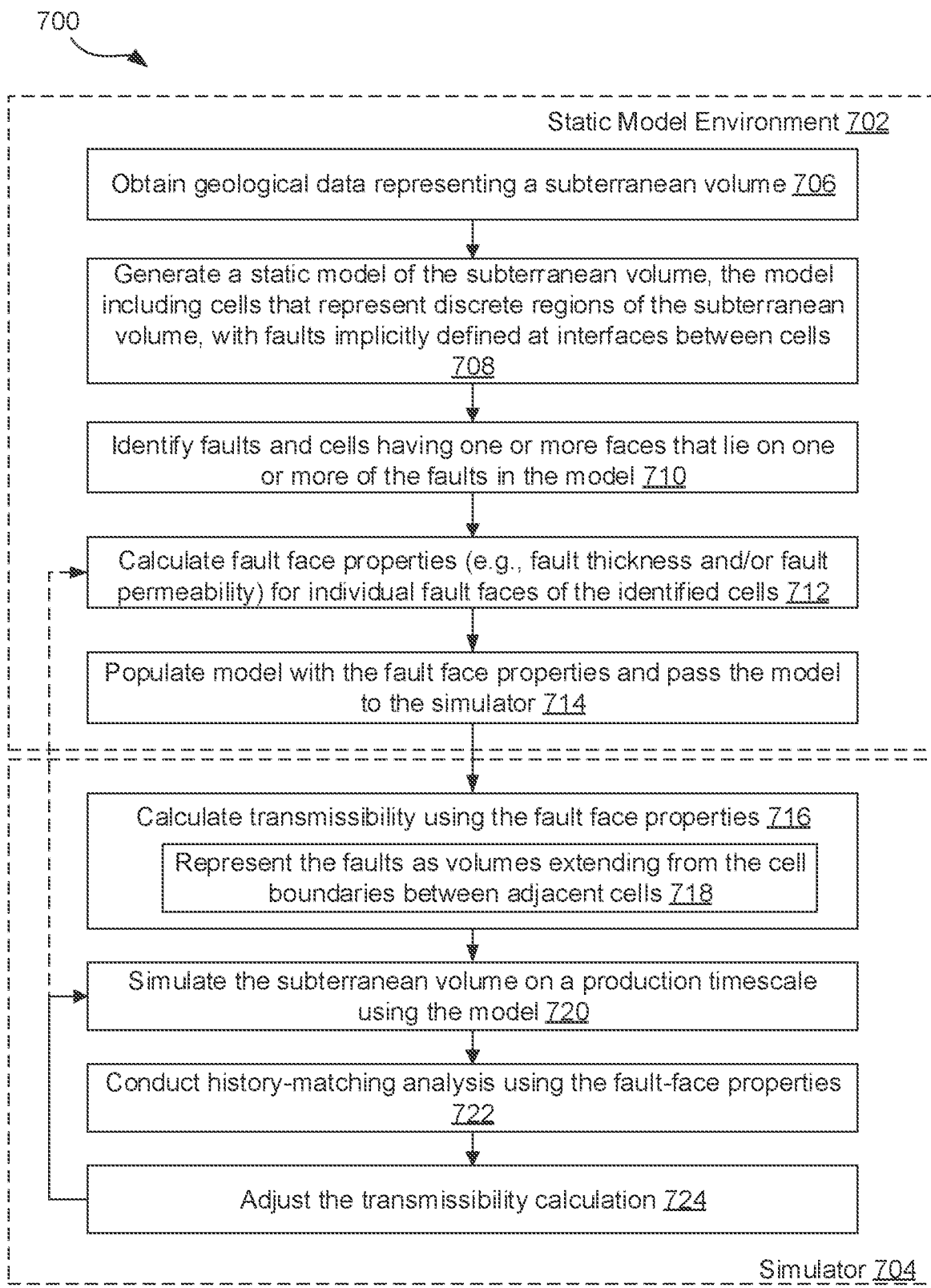
FIG. 7 illustrates a flowchart of a method for modeling fault properties and simulating a model, according to an embodiment.

Turning to the specific, illustrated embodiment, FIG. 7 illustrates a flowchart of a method 700 for modeling a subterranean volume and simulating fluid flow therein, according to an embodiment. The method 700 may provide at least a portion of blocks 208 and 210 of FIG. 2 and/or others, but in other embodiments, may be executed separately therefrom. Further, it will be appreciated that the individual worksteps described herein for the method 700 may be conducted in a different order than shown, combined with other worksteps, conducted in parallel with other worksteps, or separated into two or more worksteps, without departing from the scope of the present disclosure.

The method 700 may be executed in two stages 702, 704, in which stage 702 uses a static model environment and stage 704 uses a simulator. The operation of the stages 702, 704 may be iterative, with changes made in one stage affecting the operation of the other stage.

The stage 702 may begin with obtaining geological data representing the subterranean volume, as at 706. Next, the method 700 may include generating a static model of the subterranean volume, as at 708. The model may include a grid of cells, similar to (or the same as) the grid of cells discussed above. The cells represent discrete regions of the subterranean volumes. Faults that are present in the subterranean model are represented implicitly, i.e., the faults affect cell boundary properties (e.g., transmissibility), but are not separately represented by cells.

The method 700 may include identifying faults and cells that have one or more faces that lie on one or more of the faults, as at 710. The faults in the grid may be represented implicitly, e.g., as faces of the cells, but instead of calculating a multiplier for transmissibility across an entire fault, the present method 700 may calculate fault properties, such as fault thickness and/or fault permeability, for the individual fault faces of the identified cells, as at 712.

Fault permeability and fault thickness may be spatially varying and act at individual cell-to-cell connections across the fault. These two fault-face properties together with the description of the fault faces, adjacent grid cell geometry and adjacent grid cell permeability may allow the reservoir simulator (next phase 704) to both calculate and geologically modify the fault transmissibility within the various cell-to-cell transmissibility calculation approximations available. This may enable consistent adjustment of the fault flow behavior via a modifier to the geological fault properties.

The method 700 may also include populating the model with the fault-face properties, as at 714, and then passing the model 716 to the simulator, thereby beginning the second stage 704. The simulator may then calculate transmissibility using the fault face properties, as at 716. For example, the simulator may represent the faults as volumes extending from the cell boundaries between adjacent cells, as at 718.

The method 700 may then, at 720, include simulating the subterranean volume on a production timescale using the model, e.g., including the transmissibility calculated at 716. In an extended workflow, the full geological definition of the fault properties may be integrated fully into this history matching workflow. The full uncertainty and optimization approach may then refer to the input static geological properties, the grid geometry (specifically the fault displacement as a structural uncertainty), and the fault property algorithms and relationships.

Figure 8:
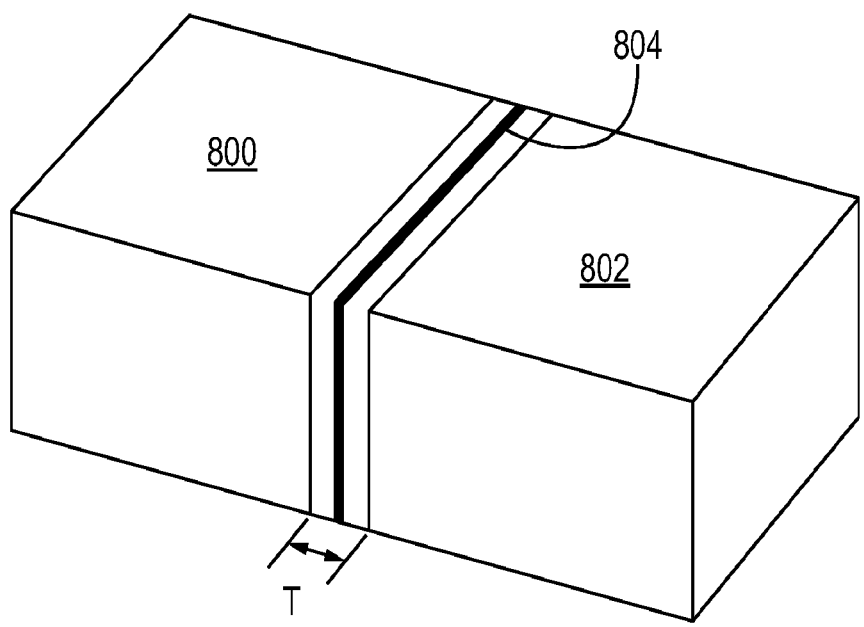
FIG. 8 illustrates a conceptual view of two cells with a fault implicitly defined therebetween and considered by the simulator to have a thickness and permeability, according to an embodiment.

Referring additionally to FIG. 8, there is illustrated a conceptual view of this representation of the faults, according to an embodiment. As noted above, the faults are implicit in the model, formed on cell boundaries. In FIG. 8, two adjacent "host" grid blocks (cells) 800 and 802 are shown, with a boundary 804 therebetween. The cells 800, 802 meet at a fault, and thus the boundary 804 implicitly represents the fault. As noted above, the fault properties calculated on a cellular level include fault thickness and permeability. Thus, the simulator may, in effect, consider the boundary 804 to have a thickness T and a permeability corresponding to the fault thickness and permeability. The thickness T may extend into both of the cells 800, 802. Accordingly, the fault has separate thicknesses on the two sides of the boundary 804 and the thickness T is the total of these two separate parts. The amount of thickness T that extends into the respective grid cells 800, 802 is a function of (e.g., based on, depends on) the side-dependent thickness. The simulator may thus consider the cells 800, 802 to be partially formed from the fault, and may thus calculate cell-to-cell transmissibility taking the thickness and the permeability of the fault in each cell 800, 802 into consideration.

Thus, the fault permeability and thickness properties are calculated separately at the two sides of the fault. Although the fault is represented implicitly in the grid, the effect on the cell-to-cell transmissibility is modeled by "replacing" the adjacent host grid volume with the corresponding fault volume (separately on the two sides of the fault) and calculating the combined transmissibility. This may be applied to any of the cell-to-cell transmissibility approximations used in reservoir simulation and may enable the use of a multi-point flux approximation (MPFA) for a more accurate transmissibility calculation for all of the grid cells during simulation.

The internal transmissibility algorithms may be executed within a simulator to calculate and apply the fault transmissibility for the cells that are adjacent to the fault. Thus, the fault property data may become part of the normal cell-to-cell transmissibility calculation for the grid in the simulator. The details of this calculation are represented in FIG. 8 for simple cell-to-cell connection. In general, the approach for cells that partially overlap at faults may be more complex.

The method 700 may also include conducting a history-matching analysis using the fault-face properties, as at 722. In this process, the user will want to 'tune' their model to match known historical data. The method 700 may tune the simulation based on the history-matching analysis by adjusting the transmissibility calculation, as at 724. The adjustment may be a simple manipulation of the previously calculated fault thickness and permeability or it could be a more complex re-calculation of any input to the original calculation. For example, the method 700 may iterate back directly to simulating the fluid flow again or may return to block 712 and recalculate the fault face properties in total. In some embodiments, adjusting at 724 may be accomplished by changing a multiplier for one or more of the fault-face properties, and thus such changing of a multiplier of a fault-face properties is within the scope of the phrase "adjusting one or more of the fault-face properties" of the model.

The process involves applying changes to the geological grid permeability and the transmissibility of the entire fault. The reservoir simulator may thus allow the user to manipulate the provided fault-face properties directly and/or supply multipliers to them as history-matching parameters. That is, the multipliers are associated with the fault-face properties (e.g., fault thickness and permeability) and not directly to the transmissibility. Hence, the user may run uncertainty analyses on the geological parameters in order to understand the sensitivity of their model to geologically sensible modifications of the fault transmissibility calculation. This may increase accuracy and facilitate arriving at a history match under an improved geological representation of the reservoir, thus providing better forward predictions of reservoir performance.

The method 700 may thus generate a model of the subterranean domain that incorporates the implicit modeling of the faults, while more accurately modeling the transmissibility by considering fault thickness and permeability on the cellular level during simulation. In addition, the model may be visualized on a computer screen to assist with, for example, the identification of probable hydrocarbon reservoirs, production amounts in wells, etc. The computer-generated model may thus more accurately represent the subterranean volume than other models.

Computing Environment

Figure 9:
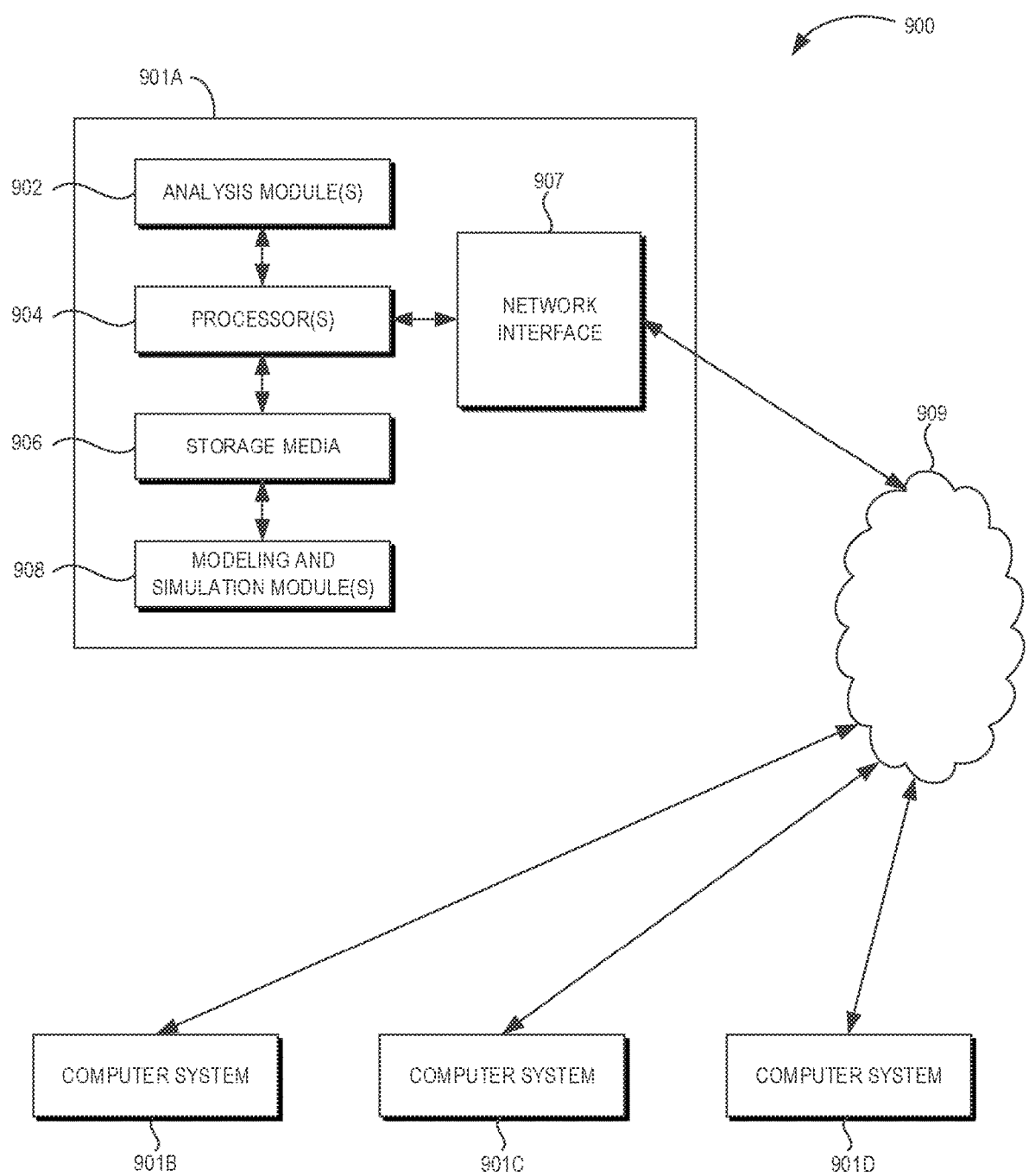
FIG. 9 illustrates a schematic view of a computing system, according to an embodiment.

In some embodiments, the methods of the present disclosure may be executed by a computing system. FIG. 9 illustrates an example of such a computing system 900, in accordance with some embodiments. The computing system 900 may include a computer or computer system 901A, which may be an individual computer system 901A or an arrangement of distributed computer systems. The computer system 901A includes one or more analysis modules 902 that are configured to perform various tasks according to some embodiments, such as one or more methods disclosed herein. To perform these various tasks, the analysis module 902 executes independently, or in coordination with, one or more processors 904, which is (or are) connected to one or more storage media 906. The processor(s) 904 is (or are) also connected to a network interface 907 to allow the computer system 901A to communicate over a data network 909 with one or more additional computer systems and/or computing systems, such as 901B, 901C, and/or 901D (note that computer systems 901B, 901C and/or 901D may or may not share the same architecture as computer system 901A, and may be located in different physical locations, e.g., computer systems 901A and 901B may be located in a processing facility, while in communication with one or more computer systems such as 901C and/or 901D that are located in one or more data centers, and/or located in varying countries on different continents).

A processor may include a microprocessor, microcontroller, processor module or subsystem, programmable integrated circuit, programmable gate array, or another control or computing device.

The storage media 906 may be implemented as one or more computer-readable or machine-readable storage media. Note that while in the example embodiment of FIG. 9 storage media 906 is depicted as within computer system 901A, in some embodiments, storage media 906 may be distributed within and/or across multiple internal and/or external enclosures of computing system 901A and/or additional computing systems. Storage media 906 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions or located at a remote site from which machine-readable instructions may be downloaded over a network for execution.

In some embodiments, computing system 900 contains one or more modeling and simulation module(s) 908. In the example of computing system 900, computer system 901A includes the modeling and simulation module 908. In some embodiments, a single modeling and simulation module may be used to perform some aspects of one or more embodiments of the methods disclosed herein. In other embodiments, a plurality of modeling and simulation modules may be used to perform some aspects of methods herein.

It should be appreciated that computing system 900 is merely one example of a computing system, and that computing system 900 may have more or fewer components than shown, may combine additional components not depicted in the example embodiment of FIG. 9, and/or computing system 900 may have a different configuration or arrangement of the components depicted in FIG. 9. The various components shown in FIG. 9 may be implemented in hardware, software, or a combination of both hardware and software, including one or more signal processing and/or application specific integrated circuits.

Further, the steps in the processing methods described herein may be implemented by running one or more functional modules in information processing apparatus such as general-purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 900, FIG. 9), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method, comprising:
obtaining, via one or more processors, geological data representing a subterranean volume, wherein the geological data relates to seismic data, a well log, a core sample, or a combination thereof, acquired from one or more components;
generating, via the one or more processors, a structural model of the subterranean volume in a depositional space and in a geological space, wherein the structural model comprises a grid of cells;
selecting, via the one or more processors, a first cell and a second cell of the grid of cells, the first and second cells being juxtaposed in the geological space and defining a fault face where the first and second cells are intersected by a fault;
identifying, via the one or more processors, a first point in the geological space that is on the fault face of the first and second cells in the geological space, wherein the first point in the geological space is a single point and is represented as a plurality of first points in the depositional space;
identifying, via the one or more processors, a plurality of second points in the depositional space, wherein respective second points of the plurality of second points in the depositional space are co-located with respective first points of the plurality of first points in the depositional space;
transforming, via the one or more processors, the structural model from the depositional space to the geological space to identify the plurality of second points in the geological space based on the plurality of second points in the depositional space;
calculating, via the one or more processors, a plurality of slip curves in the geological space, wherein respective slip curves originate at the first point in the geological space and extend across the fault in the geological space to respective second points of the plurality of second points in the geological space;
calculating, via the one or more processors, one or more fault rock properties at the first point based on clay properties encountered along the slip curves;
adjusting, via the one or more processors, the structural model to include the one or more fault rock properties to improve accuracy of the structural model to obtain a modified structural model having an improved geological representation of a reservoir; and
controlling, via the one or more processors, sensing, drilling, injecting, extracting, or a combination thereof, based on the modified structural model having the improved geological representation of the reservoir.

2. The method of claim 1, wherein the one or more fault rock properties comprise fault thickness, fault permeability, or a combination thereof.

3. The method of claim 1, wherein one of the plurality of first points is on an upthrown side of the fault, and another one of the plurality of first points is on a downthrown side of the fault.

4. The method of claim 3, wherein the respective first points of the plurality of first points are offset across the fault from the respective second points of the plurality of second points in the geological space.

5. The method of claim 1, wherein the plurality of slip curves comprises a downthrown slip curve that extends from the first point to a downthrown side of the fault, and an upthrown slip curve that extends from the first point to an upthrown side of the fault.

6. The method of claim 1, wherein at least one of the one or more fault rock properties are calculated based on an average of the clay properties encountered along the slip curves.

7. The method of claim 1, wherein generating the structural model comprises:
generating the structural model, in the geological space, of the subterranean volume using the geological data;
transforming the structural model from the geological space to the depositional space;
defining the grid of cells for the structural model in the depositional space; and
transforming the structural model, including the grid, to the geological space to define a depogrid.

8. The method of claim 1, wherein the geological space comprises two horizontal axes and a depth axis, and wherein the depositional space comprises two horizontal axes and a depositional time axis.

9. The method of claim 1, further comprising visualizing the modified structural model of the subterranean volume using a computer display.

10. The method of claim 1, further comprising identifying a presence of the reservoir, or simulating a production fluid flow from the reservoir, using the modified structural model having the improved geological representation of the reservoir.

11. The method of claim 1, further comprising:
calculating one or more fault-face properties for individual boundaries between adjacent cells that lie on the fault;
calculating transmissibility in the structural model using the one or more fault-face properties for the individual boundaries; and
adjusting the structural model by adjusting one or more of the fault-face properties of one of the individual boundaries.

12. A method, comprising:
obtaining geological data representing a subterranean volume, wherein the geological data relates to seismic data, a well log, a core sample, or a combination thereof, acquired from one or more components;
generating a static model of the subterranean volume, the static model comprising a grid of cells, wherein the static model is generated based on a structural model of the subterranean volume in a depositional space and a geological space, and faults in the subterranean volume are represented as boundaries between adjacent cells that lie on the faults;
calculating one or more fault-face properties for individual boundaries between the adjacent cells that lie on one of the faults based on a plurality of slip curves calculated in the geological space of the structural model;
calculating transmissibility in the static model using the one or more fault-face properties for the individual boundaries;
adjusting the static model by adjusting one or more of the fault-face properties of one of the individual boundaries to improve accuracy of the static model to generate a modified static model having an improved geological representation of a reservoir; and
controlling sensing, drilling, injecting, extracting, or a combination thereof, based on the modified static model having the improved geological representation of the reservoir.

13. The method of claim 12, further comprising history matching using the modified static model, wherein history matching comprises determining uncertainty of one or more geological parameters to determine a sensitivity of the modified static model to modifications to the transmissibility.

14. The method of claim 13, wherein the one or more geological parameters comprise static permeability, fault permeability and fault thickness multipliers, or a combination thereof.

15. The method of claim 12, wherein the one or more fault-face properties comprise fault thickness and permeability.

16. The method of claim 15, wherein the transmissibility is calculated based in part on the fault thickness and the permeability of the fault represented at the individual boundaries between the adjacent cells.

17. The method of claim 12, wherein generating the static model comprises:
generating the structural model of the subterranean volume in the depositional space and in structural the geological space, wherein the structural model comprises a grid of cells;
selecting a first cell and a second cell of the grid of cells, the first and second cells being juxtaposed in the geological space and defining a fault face where the first and second cells are intersected by a fault;
identifying a first point in the geological space that is on the fault face of the first and second cells in the geological space, wherein the first point in the geological space is a single point and is represented as a plurality of first points in the depositional space;
identifying a plurality of second points in the depositional space, wherein respective second points of the plurality of second points in the depositional space are co-located with respective first points of the plurality of first points in the depositional space;
transforming the structural model from the depositional space to the geological space to identify the plurality of second points in the geological space based on the plurality of second points in the depositional space;
calculating the plurality of slip curves in the geological space, wherein respective slip curves originate at the first point in the geological space and extend across the fault in the geological space to respective second points of the plurality of second points in the geological space;
calculating one or more fault rock properties at the first point based on clay properties encountered along the slip curves; and
adjusting the structural model to include the one or more fault rock properties to improve accuracy of the structural model to obtain a modified structural model.

18. A non-transitory, computer-readable medium storing instructions that, when executed, cause one or more processors of a computing system to perform operations, the operations comprising:
obtaining geological data representing a subterranean volume, wherein the geological data relates to seismic data, a well log, a core sample, or a combination thereof, acquired from one or more components;
generating a structural model of the subterranean volume in a depositional space and in a geological space, wherein the structural model comprises a grid of cells;
selecting a first cell and a second cell of the grid of cells, the first and second cells being juxtaposed in the geological space and defining a fault face where the first and second cells are intersected by a fault;
identifying a first point in the geological space that is on the fault face of the first and second cells in the geological space, wherein the first point in the geological space is a single point and is represented as a plurality of first points in the depositional space;
identifying a plurality of second points in the depositional space, wherein respective second points of the plurality of second points in the depositional space are co-located with respective first points of the plurality of first points in the depositional space;
transforming the structural model from the depositional space to the geological space to identify the plurality of second points in the geological space based on the plurality of second points in the depositional space;
calculating a plurality of slip curves in the geological space, wherein respective slip curves originate at the first point in the geological space and extend across the fault in the geological space to respective second points of the plurality of second points in the geological space;

calculating one or more fault rock properties at the first point based on clay properties encountered along the slip curves;

adjusting the structural model to include the one or more fault rock properties to improve accuracy of the structural model to obtain a modified structural model having an improved geological representation of a reservoir; and controlling sensing, drilling, injecting, extracting, or a combination thereof, based on the modified structural model having the improved geological representation of the reservoir.

19. The medium of claim 18, wherein the operations further comprise:

calculating one or more fault-face properties for individual boundaries between adjacent cells that lie on the fault;

calculating transmissibility in the structural model using the one or more fault-face properties for the individual boundaries; and adjusting the structural model by adjusting one or more of the fault-face properties of one of the individual boundaries.

20. The medium of claim 18, wherein generating the structural model comprises:

generating the structural model, in the geological space, of the subterranean volume using the geological data;

transforming the structural model from the geological space to the depositional space;

defining the grid of cells for the structural model in the depositional space; and transforming the structural model, including the grid, to the geological space to define a depogrid.

* * * * *